(12) United States Patent
Nash et al.

(10) Patent No.: US 8,033,738 B2
(45) Date of Patent: Oct. 11, 2011

(54) NEEDLE ROLLER BEARING

(75) Inventors: Richard P. Nash, Frankenmuth, MI (US); Ravi Ravindra, Saginaw, MI (US); Michael D. Smith, Oxford, MI (US)

(73) Assignee: Nexteer (Beijing) Technology Co., Ltd.

( * ) Notice: Subject to any disclaimer, the term of this patent is extended or adjusted under 35 U.S.C. 154(b) by 504 days.

(21) Appl. No.: 11/973,775

(22) Filed: Oct. 9, 2007

(65) Prior Publication Data

US 2008/0112662 A1 May 15, 2008

Related U.S. Application Data

(60) Provisional application No. 60/857,900, filed on Nov. 9, 2006.

(51) Int. Cl.
*F16C 33/34* (2006.01)

(52) U.S. Cl. ......... 384/566; 384/565; 384/567; 464/132

(58) Field of Classification Search .......... 384/565–567, 384/574, 548, 551, 553, 618; 464/132; 411/34, 411/80.5, 324, 479
See application file for complete search history.

(56) References Cited

U.S. PATENT DOCUMENTS

| | | | | |
|---|---|---|---|---|
| 828,387 A * | 8/1906 | Crane | ........................... | 384/567 |
| 1,887,176 A * | 11/1932 | Young | ........................... | 384/566 |
| 1,926,123 A * | 9/1933 | Strickland | ..................... | 384/566 |
| 2,251,714 A * | 8/1941 | Onions | ......................... | 384/566 |
| 3,441,327 A * | 4/1969 | Peter et al. | .................... | 384/463 |
| 3,757,601 A * | 9/1973 | Burke | ............................ | 74/492 |
| 4,133,587 A * | 1/1979 | Kume | ........................... | 384/461 |
| 4,505,523 A * | 3/1985 | Stephan | ........................ | 384/445 |
| 4,890,943 A | 1/1990 | Tanaka | ........................... | 384/572 |
| 5,324,119 A | 6/1994 | Harimoto et al. | ............. | 384/548 |
| 5,415,612 A | 5/1995 | Carlson et al. | .................. | 492/56 |
| 5,802,945 A | 9/1998 | Brinkmeier et al. | ............ | 83/660 |
| 6,334,714 B1 * | 1/2002 | Harimoto et al. | ............. | 384/569 |
| 6,644,138 B2 * | 11/2003 | Dorrie | ........................... | 384/491 |
| 7,032,704 B2 * | 4/2006 | Zernickel et al. | ............. | 384/567 |
| 7,101,285 B2 * | 9/2006 | Sekine | .......................... | 464/132 |
| 2004/0101225 A1* | 5/2004 | Del Rio et al. | ................ | 384/553 |

FOREIGN PATENT DOCUMENTS

GB 2004600 A * 4/1979

OTHER PUBLICATIONS

Spring Pins Streamline Automation; Date Jul. 14, 2007; http:machinedesign.com/ContentItem/68736/SpringPins-StreamlineAutomation.aspx Circlips (Australia) PTY.LTD; Spring Pins.
Connex; Spring Pins: http://www.connexusa.com/HTML/pins.html.

* cited by examiner

*Primary Examiner* — Thomas R Hannon
(74) *Attorney, Agent, or Firm* — Cantor Colburn LLP

(57) ABSTRACT

A bearing assembly is provided including at least one needle roller that is resiliently compressible in response to a load applied to an exterior surface thereof. In addition, a method is provided for taking up a clearance between one or more first rollers and a bearing race in which the rollers are positioned. At least one resiliently compressible second roller is provided rollably secured within the bearing. The compressible second roller has an outer diameter greater than an outer diameter of any of the first rollers, such that the compressible second roller resiliently compresses when the bearing is positioned in the bearing race. Forces generated by compression of the resiliently compressible second roller urge the first rollers against a surface of the bearing race, thereby taking up the clearance between the first rollers and the race.

14 Claims, 6 Drawing Sheets

NEEDLE ROLLER BEARING

CROSS REFERENCE TO RELATED APPLICATIONS

This application claims the benefit of provisional application Ser. No. 60/857,900 filed on Nov. 9, 2006.

TECHNICAL FIELD

The present invention relates to needle roller bearings and, more particularly, to a roller for a needle roller bearing.

BACKGROUND OF THE INVENTION

Needle roller bearings are used in a wide variety of applications. FIGS. 1 and 2 illustrate one such application, wherein the needle roller bearings are incorporated into an intermediate shaft assembly 10 for connecting a steering wheel of an automobile to a rack-and-pinion gear assembly of an automobile steering system. Referring to FIGS. 1 and 2, the intermediate shaft assembly 10 shown comprises a first yoke 12, a first spider assembly 14 rotationally coupled to first yoke 12, and a steering column clamp yoke 16 rotationally coupled to first spider 14 to form a first Cardan joint assembly. Shaft assembly 10 also includes a seal 18, a hollow tubular shaft 20, a solid shaft 22 extending from an interior of the tubular shaft, a second yoke 24 mounted to solid shaft 22, a second spider assembly 26 rotationally coupled to second yoke 24, and a gear clamp yoke 28 rotationally coupled to the second spider. The second yoke 24, second spider 26, and gear clamp yoke 28 combine to form a second Cardan joint assembly coupled to solid shaft 22.

In the shaft assembly shown in FIGS. 1 and 2, first spider 14 and second spider 26 are basically identical. Therefore, the following description of spider 26 is equally applicable to spider 14. As seen in FIG. 2, each spider 26 has a central hub 26a and a plurality of trunnions 26b extending from the hub. A needle roller bearing 30 as shown in FIG. 3 is mounted to each of trunnions 26b. As seen in FIG. 3, each needle roller bearing 30 comprises a plurality of conventional solid needle rollers 34 and a cage 36. Cage 36 may be a plastic molded type cage or a stamped sheet metal type cage that includes spaced end rings 38 and 40 that are connected by a plurality of cross bars 42 to form a plurality of roller receiving windows.

Needle rollers 34 run directly along an interior cylindrical surface (not shown) inside a hole 44 (FIG. 1) formed in yoke 24.

Needle rollers 34 also run directly along an exterior cylindrical surface (not shown) formed along each trunnion 26b of spider 26. These interior surfaces and exterior surfaces form inner and outer races for the needle rollers 34.

In existing joint assemblies of the type just described, differences in the diameters of the needle rollers mounted in a given bearing can cause a pronounced rattling of the bearing in the joint, resulting from intermittent contact between undersized needle rollers and the trunnion and/or yoke during operation of the joint. To help prevent this rattling, the diameters of the needle rollers and the diameters of the portions of the trunnions contacting the needle rollers must be held to within very tight tolerances to help ensure noise-free operation of the joint. This greatly increases the expense of the joint.

SUMMARY OF THE INVENTION

In one aspect of the invention, a bearing assembly is provided including at least one needle roller that is resiliently compressible in response to a load applied to an exterior surface thereof.

In another aspect of the invention, a method is provided for taking up a clearance between at least one first roller of a plurality of first rollers rollably secured within a roller bearing and a bearing race in which the first roller is rollably positioned. The method includes the step of providing at least one resiliently compressible second roller rollably secured within the bearing, the at least one resiliently compressible second roller having an outer diameter greater than an outer diameter of any first roller of the plurality of first rollers, such that the at least one resiliently compressible second roller resiliently compresses when the bearing is positioned in the bearing race. Forces generated by compression of the resiliently compressible second roller urge the at least one first roller against a surface of the bearing race, thereby taking up the clearance between the at least one first roller and the race.

DETAILED DESCRIPTION

Figure 1:
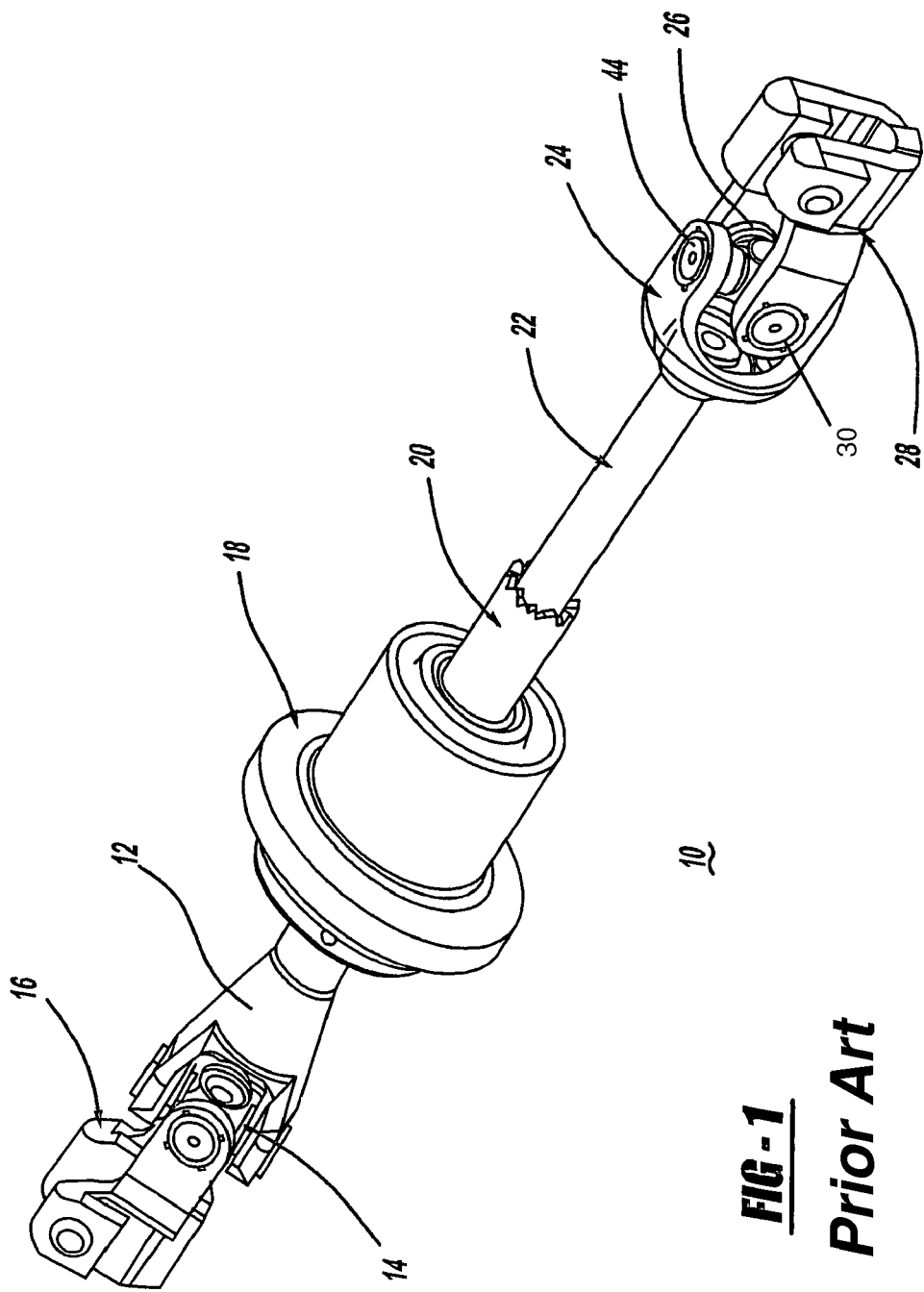
FIG. 1 is a perspective view of an existing shaft assembly.
Figure 2:
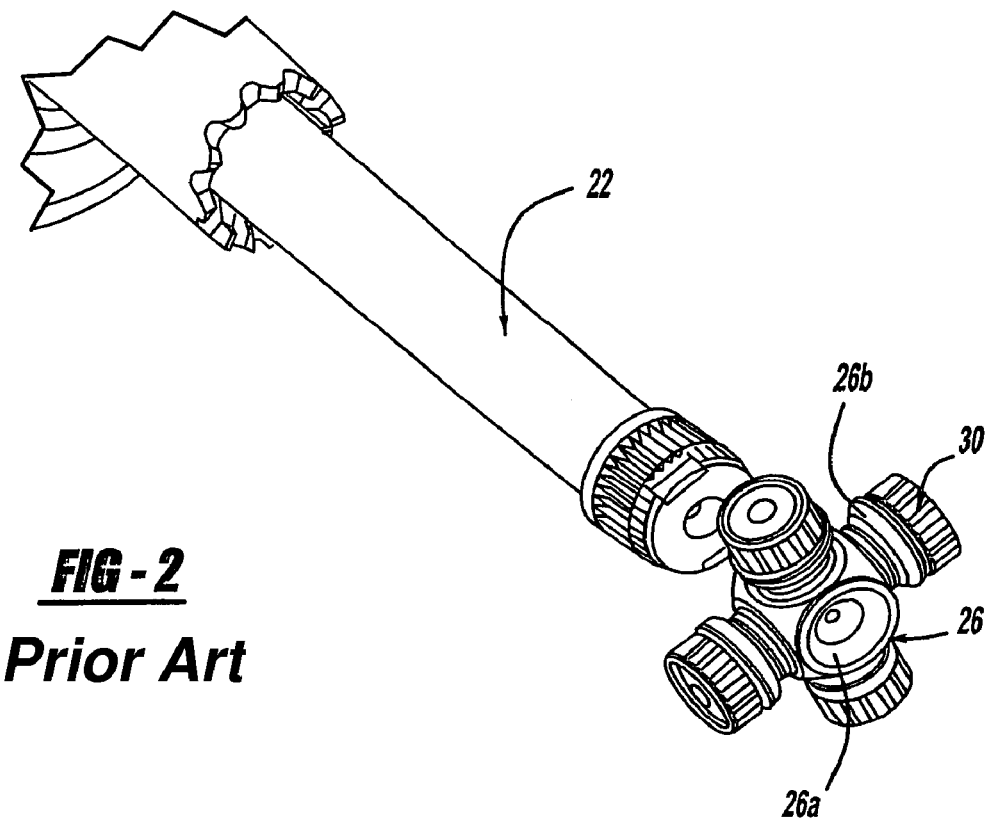
FIG. 2 is an exploded perspective view of a portion of the shaft assembly shown in FIG. 1.
Figure 3:
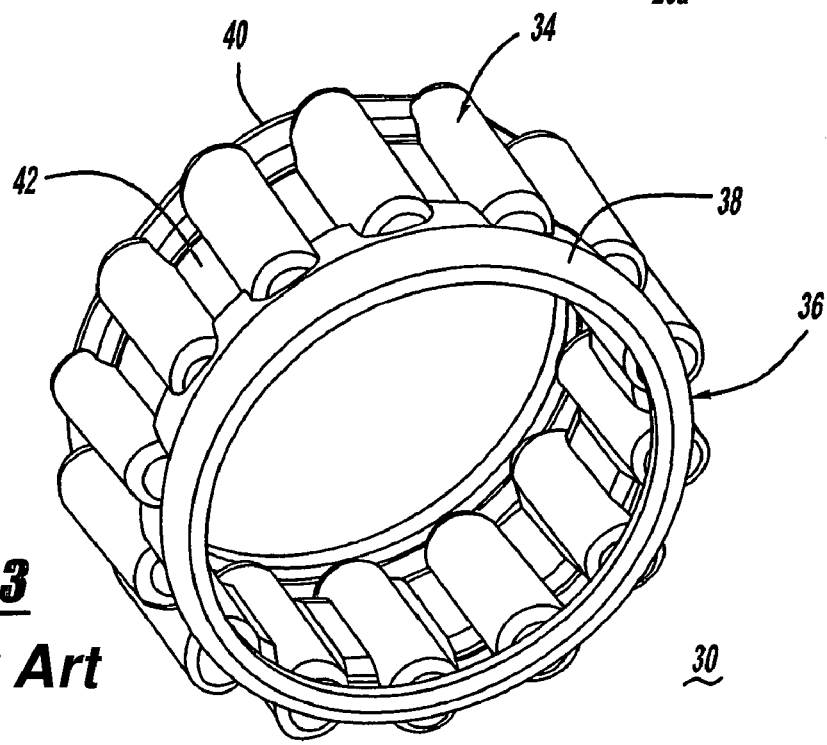
FIG. 3 is a perspective view of a bearing incorporating conventional needle rollers.
Figure 4:
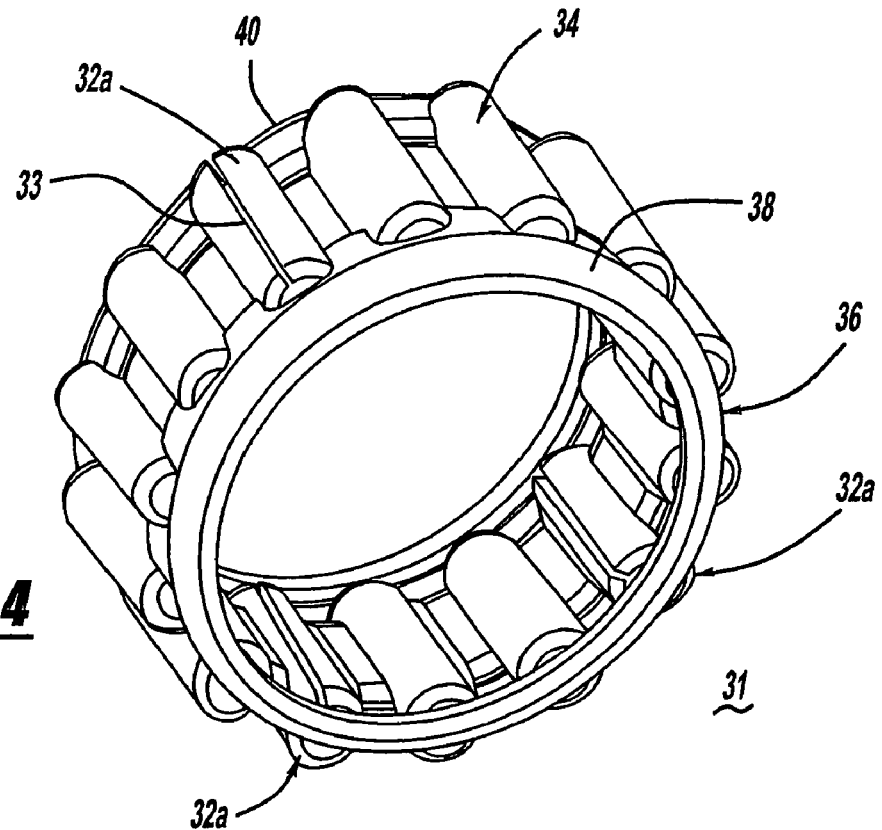
FIG. 4 is a perspective view of a needle roller bearing incorporating compressible needle rollers in accordance with a first embodiment of the present invention.
Figure 5:
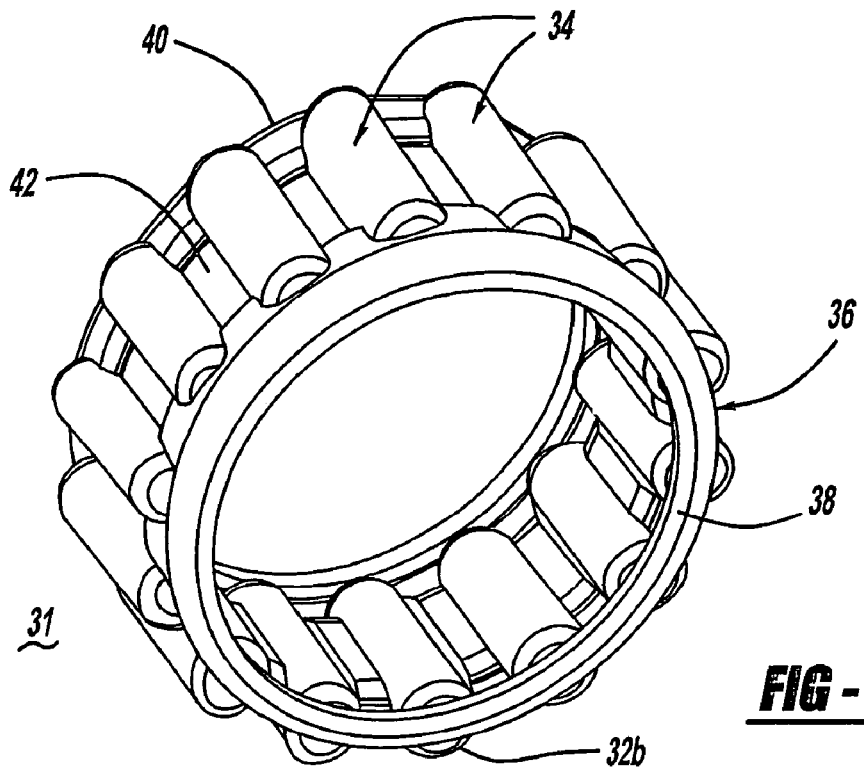
FIG. 5 is a perspective view of a needle roller bearing incorporating compressible needle rollers in accordance with a second embodiment of the present invention.
Figure 6:
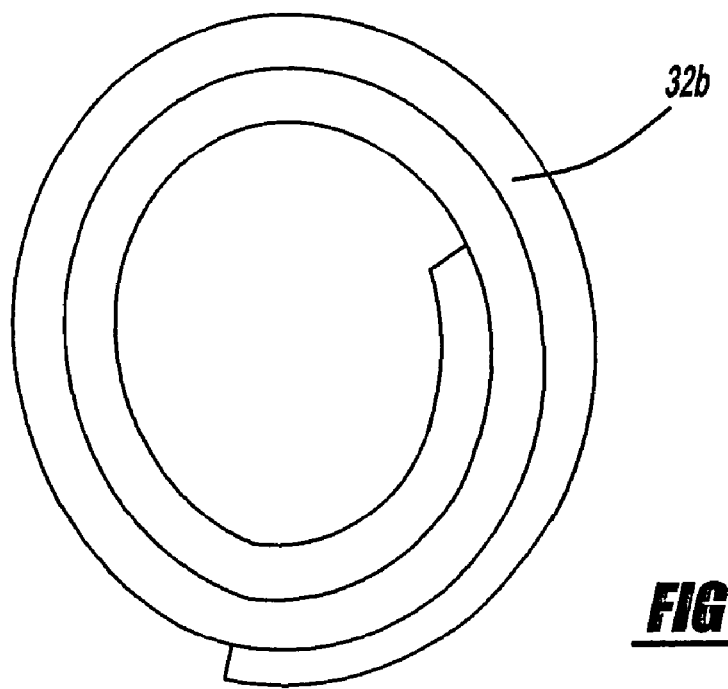
FIG. 6 is an end view of a compressible needle roller incorporated into the embodiment of the bearing shown in FIG. 5.
Figure 7:
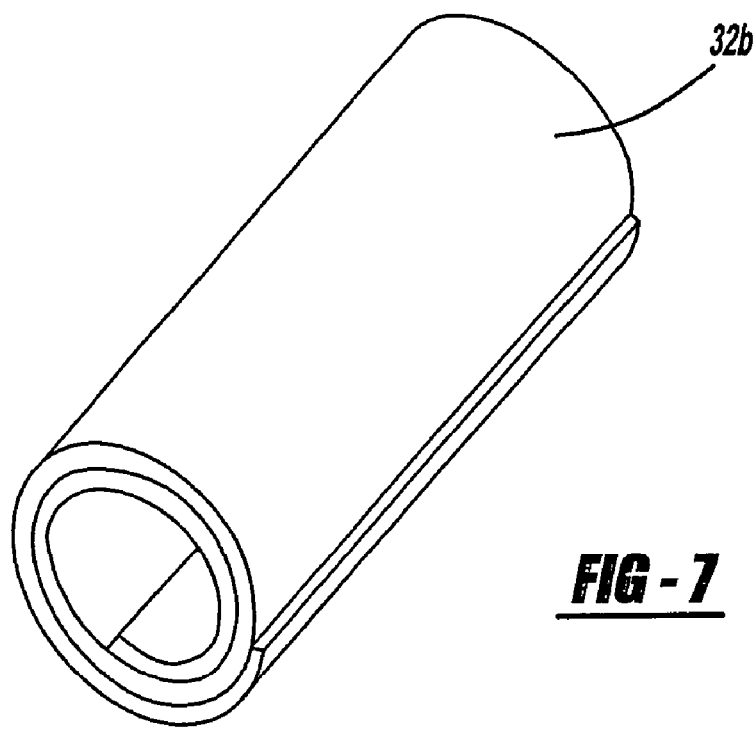
FIG. 7 is a perspective view of the needle roller shown in FIG. 6.
Figure 8:
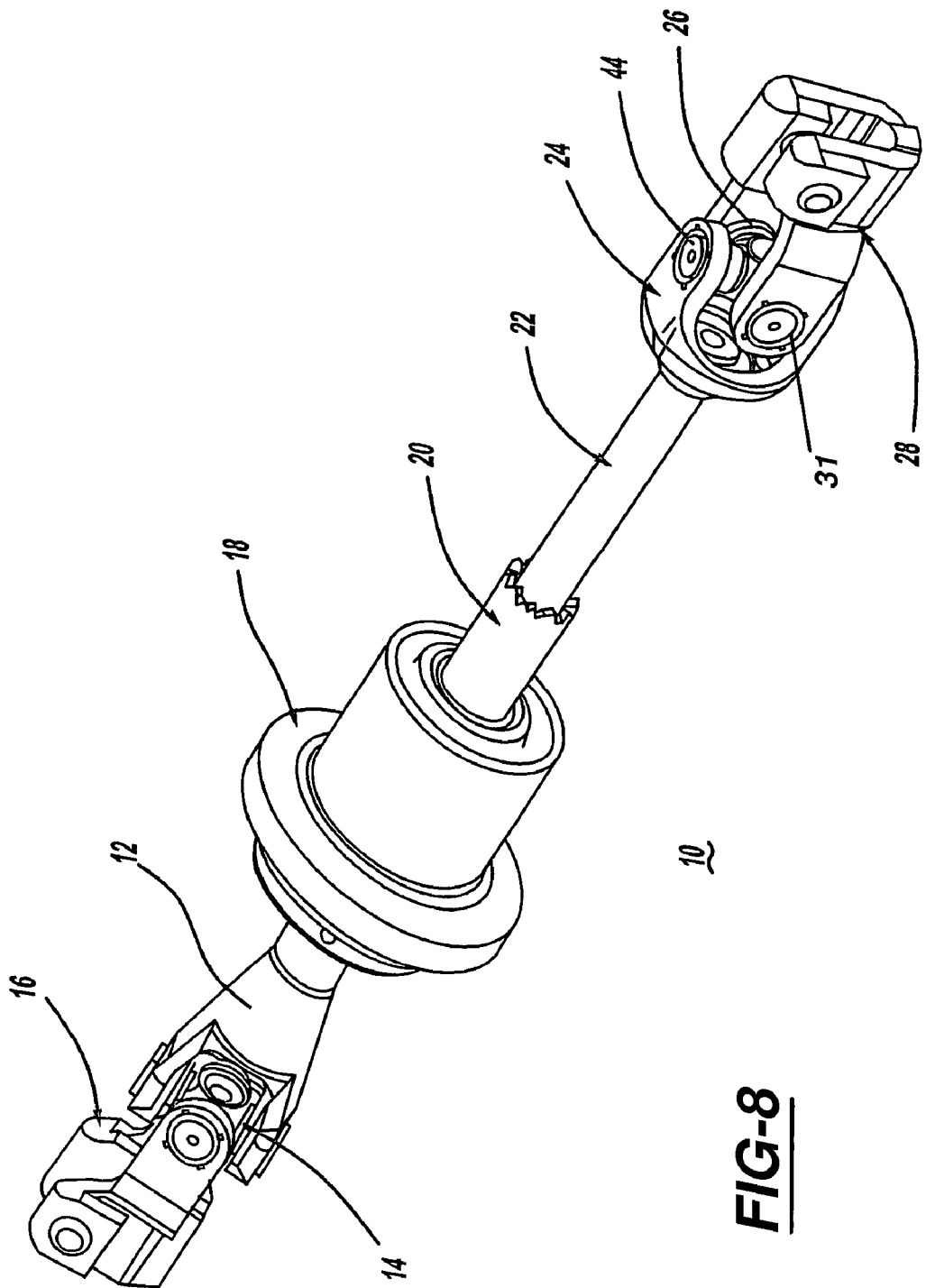
FIG. 8 is a perspective view of an existing shaft assembly suitable for incorporating a needle roller bearing in accordance with the present invention.
Figure 9:
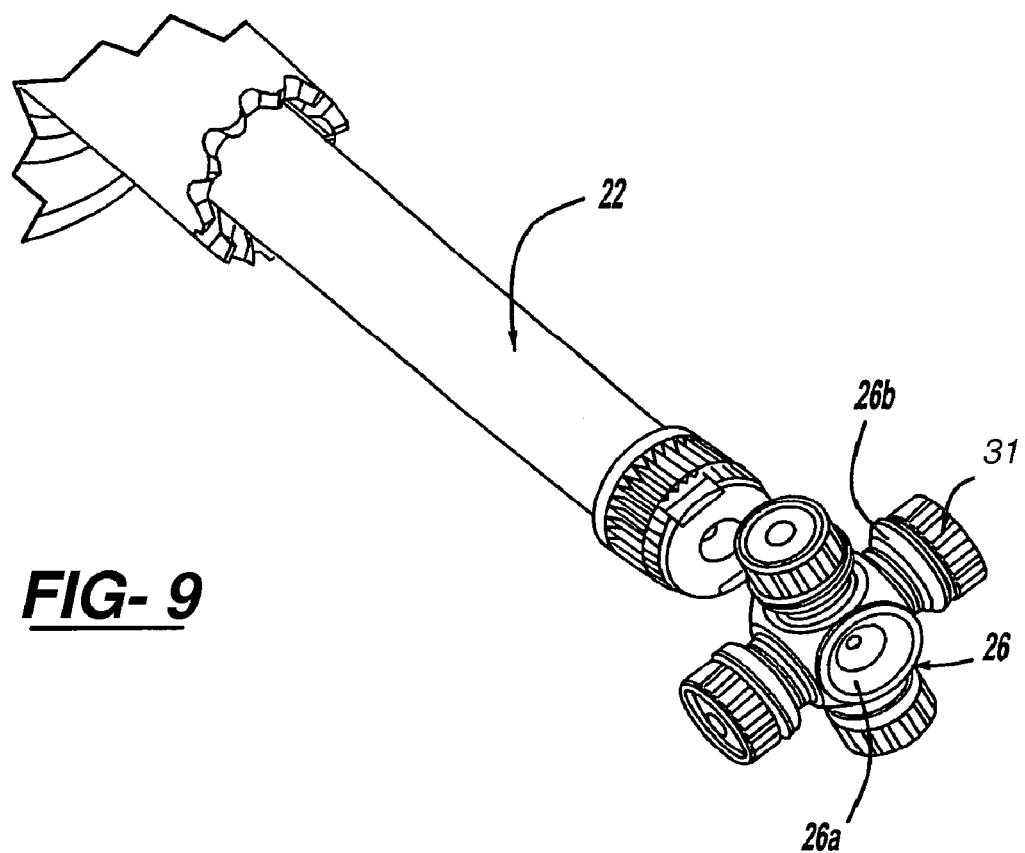
FIG. 9 is an exploded perspective view of a portion of the shaft assembly shown in FIG. 8.

Referring to FIGS. 4-7, and in accordance with the present invention, a needle roller 32 is provided which is resiliently compressible in response to a load applied to an exterior surface thereof. In FIG. 4, a first embodiment of the needle roller is incorporated into a bearing assembly 31 and is in the form of a generally cylindrical spring pin 32a having a longitudinal slit 33 comprising spaced-apart, longitudinally extending edges formed along the length thereof as shown, for example, in FIG. 4. In another embodiment (FIGS. 5-7), the needle roller is in the form of a spiral-wound pin 32b having a plurality of concentric, radially-overlapping layers as shown in FIGS. 6-7. Rollers 32 may be formed from steel, metal alloys, and/or other suitable materials using known methods. The compressible needle rollers 32 may be subjected to a hardening process or other heat treatment as required for a particular application.

Needle rollers 32 in accordance with the present invention may replace any desired number of conventional needle rollers 34 in a given bearing assembly. However, as seen in FIGS. 4 and 5, in most embodiments at least some conventional needle rollers will be included in the bearing. In one embodiment of the bearing assembly, the bearing incorporates two or more compressible needle rollers 32. In a particular embodiment, two compressible needle rollers 32 angularly spaced apart approximately 90.degree. are included in the bearing.

Other particular embodiments incorporating three compressible needle rollers (spaced apart for example, approximately 120.degree.) and four compressible needle rollers are also contemplated. Although particular numbers of compressible rollers and roller arrangements may be shown herein for purposes of illustration, it will be understood that any number of compressible rollers and any spatial arrangement of the rollers deemed suitable for a particular application may be employed.

Prior to installation of the needle roller bearing into a joint, needle rollers 32 of the present invention are slightly oversized in comparison to conventional needle rollers 34 incorporated into the bearing. When installed in a joint (e.g., the Cardan joint of an intermediate shaft as described above), needle rollers 32 of the present invention are slightly compressed radially. Upon assembly, the oversized compressible needle rollers 32 will conform to the outer diameter of the trunnion 26b and the inside diameter of the hole 44 formed in yoke 24, helping to ensure a correct operational fit between the yoke and the trunnion. During operation of the joint, the compressible needle rollers 32 will tend to resiliently expand or compress in response to forces exerted on the rollers by the trunnions and/or the yoke, thereby taking up clearances resulting from minute differences in the diameters of the other, conventional needle rollers. This aids in preventing rattling of the bearing in the joint.

Stated another way, a clearance between one or more conventional rollers and a bearing race (or races) in which they roll can be taken up by providing at least one resiliently compressible second roller rollably secured within the bearing, the resiliently compressible roller having an outer diameter greater than an outer diameter of any conventional roller. The outer diameter of the compressible roller is sized such that the roller resiliently compresses when the bearing is positioned in the bearing race. Forces generated by compression of the compressible roller then urge the conventional rollers against the surface of the bearing race, thereby taking up the clearances between the conventional rollers and the bearing races.

Needle rollers as described herein may be formed having dimensions suitable for use in any size of bearing. In addition, resiliently compressible needle rollers as described herein may be incorporated into bearings suitable for any of a variety of applications utilizing needle roller bearings.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended Claims and their equivalents.

What is claimed is:

1. A rotatable bearing assembly comprising a plurality of substantially non-compressible needle rollers and at least one needle roller that is resiliently and radially compressible in response to a load applied to an exterior surface thereof, the at least one resiliently compressible needle roller has an outer diameter greater than an outer diameter of any of the substantially non-compressible needle rollers, the at least one resiliently compressible needle roller comprising a spiral-wound pin having a plurality of concentric, radially-overlapping layers.

2. A shaft assembly including a bearing assembly in accordance with claim 1.

3. The shaft assembly of claim 2 wherein the shaft assembly is for connecting a steering wheel of an automobile to a rack-and-pinion gear assembly of an automobile steering system.

4. The bearing assembly of claim 1 wherein the assembly includes two resiliently and radially compressible needle rollers.

5. The bearing assembly of claim 4 wherein the needle rollers are angularly spaced apart approximately 90°.

6. The bearing assembly of claim 1 wherein the assembly includes three resiliently and radially compressible needle rollers.

7. A universal joint assembly including a bearing assembly in accordance with claim 1.

8. A bearing assembly comprising at least one needle roller that is resiliently and radially compressible in response to a load applied to an exterior surface thereof, the at least one resiliently compressible needle roller comprising a spiral-wound pin having a plurality of concentric, radially-overlapping layers.

9. A shaft assembly including a bearing assembly in accordance with claim 8.

10. The shaft assembly of claim 9 wherein the shaft assembly is for connecting a steering wheel of an automobile to a rack-and-pinion gear assembly of an automobile steering system.

11. The bearing assembly of claim 8 wherein the assembly includes two resiliently and radially compressible needle rollers.

12. The bearing assembly of claim 11 wherein the needle rollers are angularly spaced apart approximately 90°.

13. The bearing assembly of claim 8 wherein the assembly includes three resiliently and radially compressible needle rollers.

14. A universal joint assembly including a bearing assembly in accordance with claim 8.

* * * * *